(12) United States Patent
Naito et al.

(10) Patent No.: US 7,011,692 B2
(45) Date of Patent: Mar. 14, 2006

(54) POWDER COMPOSITION FOR CAPACITOR, SINTERED BODY USING THE COMPOSITION AND CAPACITOR USING THE SINTERED BODY

(75) Inventors: Kazumi Naito, Chiba (JP); Kazuhiro Omori, Chiba (JP); Nobuyuki Nagato, Chiba (JP)

(73) Assignee: Showa Denko K.K., Tokyo (JP)

( * ) Notice: Subject to any disclaimer, the term of this patent is extended or adjusted under 35 U.S.C. 154(b) by 81 days.

(21) Appl. No.: 10/682,935

(22) Filed: Oct. 14, 2003

(65) Prior Publication Data

US 2004/0200317 A1    Oct. 14, 2004

Related U.S. Application Data

(63) Continuation of application No. 09/857,109, filed as application No. PCT/JP00/06770 on Sep. 29, 2000, now Pat. No. 6,660,057.

(60) Provisional application No. 60/169,626, filed on Dec. 8, 1999.

(30) Foreign Application Priority Data

Oct. 1, 1999    (JP)    ................................ 11-281847

(51) Int. Cl.
*B22F 1/00*    (2006.01)

(52) U.S. Cl. ............................ 75/252; 75/244; 75/245; 361/305

(58) Field of Classification Search .................. 75/230, 75/236, 246, 252, 244, 245; 361/305
See application file for complete search history.

(56) References Cited

U.S. PATENT DOCUMENTS

| 3,825,802 | A | * | 7/1974 | Kumagai et al. ........... 361/529 |
| 4,084,965 | A | | 4/1978 | Fry |
| 4,128,421 | A | | 12/1978 | Marsh et al. |
| 4,154,609 | A | * | 5/1979 | Hahn ........................ 75/252 |
| 4,214,293 | A | | 7/1980 | Sterling et al. |
| 4,235,629 | A | | 11/1980 | Marsh et al. |
| 4,569,693 | A | | 2/1986 | Albrecht et al. |
| 4,954,169 | A | | 9/1990 | Behrens |
| 4,957,541 | A | | 9/1990 | Tripp et al. |
| 5,448,447 | A | | 9/1995 | Chang |
| 5,825,611 | A | | 10/1998 | Pozdeev |
| 6,576,069 | B1 | * | 6/2003 | Huber et al. ................ 148/422 |

FOREIGN PATENT DOCUMENTS

| DE | 2743061 A | 3/1979 |
| GB | 1030004 A | 5/1966 |
| GB | 1219748 | 1/1971 |
| JP | 60-121207 | 6/1985 |
| JP | 03-150822 A | 6/1991 |
| JP | 05-009790 A | 1/1993 |
| JP | 10-242004 | 9/1998 |
| WO | WO 98/19811 | 5/1998 |

OTHER PUBLICATIONS

"Reactions During Sintering of Niobium Powder from Aluminothermic Reduction Product," R&HM, Dec. 1985, vol. 4, pp. 189-194.
"The Influence of Gas Atmospheres on the First-Stage Sintering of High-Purity Niobium Powders," Metallurigcal Transactions, Jun. 1984, vol. 15A, pp. 1111-1116.
Supplementary European Search Report for EP 00 96 2979 dated Aug. 26, 2002.
Japanese Search Report.
International Search Report for PCT/JP00/06770 dated Dec. 19, 2000.

* cited by examiner

*Primary Examiner*—Ngoclan T. Mai
(74) *Attorney, Agent, or Firm*—Sugrue Mion, PLLC

(57) ABSTRACT

A powder composition for a capacitor comprising a tantalum or niobium and a compound having a silicon-oxygen bond, at least a part of which may be nitrided and which has an average particle size of from 0.1 to 5 μm; a sintered body using the composition; and a capacitor constituted by the sintered body as one part electrode, and another part electrode. A capacitor favored with high reliability, lower dissipation level of power and smaller deterioration of capacitance than conventional tantalum capacitors using tantalum can be produced by using a sintered body of the powder composition for a capacitor.

13 Claims, 1 Drawing Sheet

POWDER COMPOSITION FOR CAPACITOR, SINTERED BODY USING THE COMPOSITION AND CAPACITOR USING THE SINTERED BODY

CROSS-REFERENCE TO RELATED APPLICATIONS

This is a Continuation of application Ser. No. 09/857,109 filed Jun. 1, 2001, now U.S. Pat No. 6,660,057 which is a 371 of PCT application Ser. No. PCT/JP00/06770 filed Sep. 29, 2000, which claims benefit of provisional application Ser. No. 60/169,626 filed on Dec. 8, 1999, the above noted applications incorporated herein by reference.

TECHNICAL FIELD

The present invention relates to a novel powder composition for capacitors, to a sintered body using the composition and to a capacitor using the sintered body.

BACKGROUND ART

With an increasing demand for down-sizing in shape, high-speed processing and larger capacitance of electronic instruments such as cellular telephone and personal computer, capacitors smaller in size and greater in capacitance are needed.

Among down-sized capacitors, tantalum capacitors are preferably used because it has a large capacitance for the apparent size and exhibits good performance.

In this tantalum capacitor, a sintered body of powdered tantalum is generally used for the anode body. In order to increase the capacitance of the tantalum capacitor, it is necessary to increase the amount of the powder for capacitors used or to use a sintered body with a surface area increased by pulverizing the powdered tantalum.

According to the former method of increasing the amount of the powder for capacitors used, the capacitor size is necessarily enlarged and the requirement for downsizing cannot be satisfied. On the other hand, in the latter method of pulverizing the powdered tantalum to increase the surface area, the leakage current value (hereinafter referred to as "LC") increases although the capacitor may be increased in the capacitance. Thus, the both methods have problems in performance.

As an approach for solving these problems, a capacitor has been studied which uses a sintered body of a powdered material having a dielectric constant larger than the tantalum. As such a material having a larger dielectric constant, niobium is known.

Assuming that the leakage current value of a sintered body after electrolytic oxidization measured at a voltage of 70% of the electrolytic voltage after a lapse of 3 minutes is defined as an LC value, the LC value of a sintered body using a high-capacitance powdered tantalum having a product CV of the capacitance and the electrolytic voltage of 40,000 per 1 g is usually around 30 $\mu$A/g. Whereas, the LC value of a sintered body using conventional powdered niobium is 100 times or more larger than that.

Furthermore, the conventional capacitors using a such a sintered body as this material have another problem in that the reliability is low due to deterioration of the capacitance, and cannot be used in practice.

As such, the capacitor using a niobium sintered body disadvantageously allows the electric instrument to greatly dissipate the electric power in vain due to the LC failure. Furthermore, not a small number of capacitors deteriorate and decrease in capacitance after the use for a few years, failing in gaining sufficiently high reliability, and therefore, these cannot take the place of conventional tantalum capacitors in practice.

On the other hand, tantalum capacitors are also demanded to have larger capacitance, lower LC value and smaller deterioration in the capacitance.

SUMMARY OF THE INVENTION

Therefore, an object of the present invention is to provide a highly reliable novel powder composition for capacitors, a sintered body using the powder composition for capacitors, and a capacitor using the sintered body, which are favored with lower dissipation level of power and smaller deterioration of capacitance than capacitors using conventional tantalum powder.

The present inventors have made extensive research and have found that the above problems can be solved by a powder composition for capacitors comprising powdered tantalum or niobium and a specified amount of a compound having a silicon-oxygen bond, having an average particle diameter of 0.1 to 5 $\mu$m, a part of which may be nitrided, thus achieving the present invention.

That is, the present invention is to provide the following powder composition for capacitors, sintered body obtained from the composition and a capacitor using the sintered body.

1. A powder composition for capacitors, comprising a tantalum or a niobium and a compound having a silicon-oxygen bond.
2. The powder composition for capacitors as described in 1 above, wherein the composition comprises a compound having a silicon-oxygen bond in an amount of at least 0.5% by mass.
3. The powder composition for capacitors as described in 1 above, wherein the composition comprises a compound having a silicon-oxygen bond in an amount of at least 1% by mass.
4. The powder composition for capacitors as described in 1 above, wherein the composition comprises a compound having a silicon-oxygen bond in an amount of from 5 to 30% by mass.
5. The powder composition for capacitors as described in any one of the items (1) to (4) above, which has an average particle size of from 0.1 to 5 $\mu$m.
6. The powder composition for capacitors as described in any one of the items (1) to (5) above, wherein at least a part of the components comprised in the powder composition for capacitors is nitrided.
7. The powder composition for capacitors as described in any one of the items (1) to (6) above, wherein the tantalum or niobium comprised in the powder composition for capacitor is partially nitrided.
8. The powder composition for capacitors as described in 6 or 7 above, wherein the nitride amount is from 500 to 50,000 ppm by mass.
9. A sintered body obtained by sintering a powder composition for capacitors described in any one of 1 to 8 above.
10. A nitrided sintered body for capacitors, obtained by allowing a sintered body using a powder composition for capacitors described in any one of 1 to 5 above to stand in a nitrogen atmosphere to thereby nitride the sintered body.
11. The sintered body as described in 10 above, wherein the nitrogen amount is from 10 to 150,000 ppm by mass.

12. A capacitor comprising a sintered body described in any one of 9 to 11 above as one part electrode, a dielectric material formed on the surface of the sintered body, and another part electrode provided on the dielectric material.

DETAILED DESCRIPTION OF THE INVENTION

Figure 1:
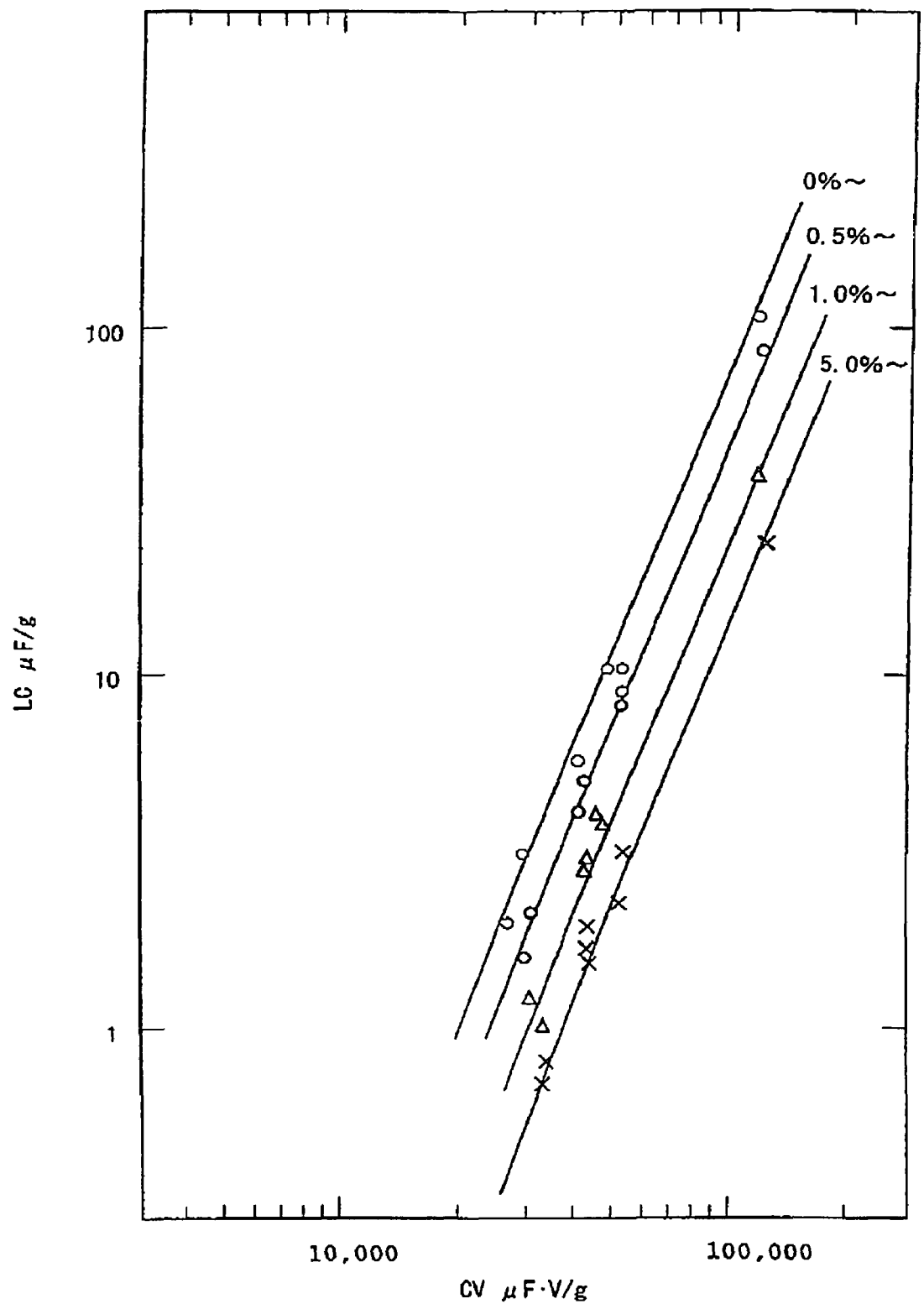
FIG. 1 is a graph illustrating the relationship between the values of product of capacitance and electrolytic voltage (CV/g) and leakage current (LV/g) of each sintered body in Example 2 for each content of a compound having a silicon-oxygen bond.

In the present invention, the above problems are solved by a powder composition comprising a tantalum or a niobium and a compound having a silicon-oxygen bond and a highly reliable capacitor using the sintered body, which is favored with lower dissipation level of power and smaller deterioration of capacitance as compared with a sintered body using conventional powdered tantalum or niobium, can be obtained. The particular mechanism of the present invention is not yet elucidated. However, it is presumed as follows.

By the EPMA (Electron Probe Micro-Analysis), the powder composition for capacitors of the present invention is confirmed to assume a composition where a part or most parts of the surface of tantalum or niobium is covered with a compound having a silicon-oxygen bond.

When a tantalum or niobium material alone is used as an anode and electrolytically oxidized, an oxide film is formed on the surface. On the other hand, in the case of the powder composition of the present invention, it is considered that at least a part of the compound having a silicon-oxygen bond is introduced into the oxide film on the surface, resulting in the formation of a novel oxide film having a dielectric constant different from (probably larger than) that of tantalum or niobium and by virtue of this novel oxide film, a sintered body using the powder composition for capacitors of the present invention exhibits a larger capacitance with the same level of LC.

Hereinafter, the powder composition for capacitors of the present invention is described in more detail.

[Compound Having a Silicon-Oxygen Bond]

The effect of the present invention can be obtained as long as when a dielectric material is formed on powdered tantalum or niobium, silicon and oxygen are contained in the dielectric material.

The compound having a silicon-oxygen bond for use in the present invention may be any as long as it contains a silicon-oxygen bond at least within the molecule. The compound may be a low molecular material, an oligomer or a polymer, and the bond order of silicon and oxygen may be either 1 or 2.

Specific examples of the compound having a silicon-oxygen bond include compounds represented by formulae (1) to (5) and condensation products thereof (which may be chained (linear products), cycled (cyclic products) or at least partly cross-linked products); monomers, oligomers and polymer compounds represented by formula (6); combined products of a residue of the compound represented by formulae (1) to (6) with one polymer selected from acryl polymer, ethylene polymer, styrene polymer: and ether polymer; oligomers and copolymers of a residue of the compound represented by formulae (1) to (6) with a monomer capable of giving a polymer such as acryl polymer, ethylene polymer, styrene polymer and ether polymer; and acid nitrides represented by formula (7).

These compounds may be used individually or in combination of two or more. Furthermore, the compound represented by any one of formulae (1) to (6) allows water to adhere by way of addition, clathration or bonding.

 $Si(OR^1)(OR^2)(OR^3)(OR^4)$ (1)

 $Si(OR^1)(OR^2)(OR^3)R^5$ (2)

 $Si(OR^1)(OR^2)R^5R^6$ (3)

 $Si(OR^1)R^5R^6R^7$ (4)

 $O=Si(OR^1)(OR^2)$ (5)

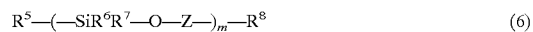 $R^5-(-SiR^6R^7-O-Z-)_m-R^8$ (6)

 $Si_pN_qO_r$ (7)

In formulae (1) to (7) above, $R^1$ to $R^8$ each represents hydrogen; an alkyl group having 6 or less carbon atoms; an alkyl group having 6 or less carbon atoms substituted with at least one of thiol, cyano, amino, hydroxy, ester, halogen, alkene, alkyne and cycloalkane; a phenyl group; an ethylenyl group; an acyl group; a silyl group represented by $SiR^1R^2R^3$ (wherein $R^1$ to $R^3$ ($R^1$, $R^2$ and $R^3$) are the same as defined above); and a metal atom (element) provided that when the valence number is 2, "$R^1R^2$" or "$R^3R^4$", when the valence number is 3, "$R^1R^2R^3$", and when the valence number is 4, "$R^1R^2R^3R^4$" each represents one metal element.

For example, when the valence number is 2, $(OR^1)(OR^2)$ forms a bond of "O-metal element-O".

Also, in formula (6), Z represents an alkylene group represented by $-(-CR^1R^2-)_n-$ (wherein $R^1$ and $R^2$ are the same as defined above, and n represents a positive integer of 6 or less) or a residue of hydrocarbon having in the main chain thereof at least one of ether, ester, amine, ketone, imide, benzene ring, double bond, heterocyclic ring and cycloalkane.

In formulae (4) and (6), $R^5$ to $R^8$ ($R^5$, $R^6$, $R^7$ and $R^8$) each may represent a halogen, NCO, NCS or CN.

In formulae (1) to (7), N represents a nitrogen atom (element), m, p, q and r represent each a positive integer.

Specific examples of these compounds include compounds of $(CH_3)_2Si(OCH_3)_2$, $\phi_2Si(OCH_3)_2$ ($\phi$ represents a phenyl group, hereinafter the same), $(CH_3)_2Si(OC_2H_5)_2$, $\phi_2Si(OC_2H_5)_2$ and $(CH_3)_2Si(OAc)_2$, and polymers as a condensate of these individual compounds or co-condensate of two or more thereof, such as silicone resin, compounds of $(CH_3)Si(OCH_3)_3$, $\phi Si(OCH_3)_3$, $(CH_3)Si(OC_2H_5)_3$, $\phi Si(OC_2H_5)_3$, $(CH_3)Si(OAc)_3$, $Cl(CH_2)_3Si(OCH_3)_3$, $HS(CH_2)_3Si(OCH_3)_3$, $NC(CH_2)_2Si(OCH_3)_3$ and $H_2N(CH_2)_3Si(OC_2H_5)_3$, and ladder silicones as a condensate of these individual compounds or a co-condensate two or more thereof, $Si(OCH_3)_4$, $Si(OC_2H_5)_4$, $Si(OAc)_4$, $(CH_3)_3SiO-CH=CH_2$ and polymerization products thereof; $(CH_3)_3SiO-CH=CH-CH_3$ and polymerization products thereof; $CH_2=CH-(CH_3)_2SiOSi(CH_3)_2CH=CH_2$ and polymerization products thereof; $CH=Si(CH_3)_2-O-Si(CH_3)_2C=CH$ and polymerization products thereof; $(CH_3)_3Si-O-Si(CH_3)_3$, $H(CH_3)_2Si-O-Si(CH_3)_2H$, $ClCH_2(CH_3)_2Si-O-Si(CH_3)_2CH_2Cl$, $HOCH_2(CH_3)_2Si-O-Si(CH_3)_2CH_2OH$, $H_2N(CH_2)_3(CH_3)_2Si-O-Si(CH_3)_2(CH_2)_3NH_2$, $\phi Si(OH)_2$, $(CH_3)_3SiOH$; silicates such as $Be_2SiO_4$, $Zn_2SiO_4$, $LiAlSiO_4$, $Li_2BeSiO_4$, $PbZnSiO_4$, (Ca, Mn)BeSiO$_4$, (Ca, Pb)Zn, Mg$_2$SiO$_4$, Fe$_2$SiO$_4$, (Mg, Fe)$_2$SiO$_4$, (Fe, Mn, Zn)$_2$SiO$_4$, (Mn, Fe)SiO$_4$, Mn$_2$SiO$_4$, (Mg, Ni)$_2$SiO$_4$, CaMgSiO$_4$, CaFeSiO$_4$, CaMnSiO$_4$, Ca$_3$Mg (SiO$_4$)$_2$ and Ca$_2$SiO$_4$; zeolite compounds such as Li$_2$Al$_2$SiO$_{12}$·2H$_2$O; Si$_2$O(NCO)$_6$, Si$_2$O$_2$(NCO)$_3$, Si$_2$O (NCS)$_6$, SiO(OCN)$_4$, Si$_4$Br$_8$O$_4$, Si$_2$OH$_6$, (H$_2$SiO)$_6$; silicon monoxides of which surface is covered with silicon dioxide; compounds having a silicon-oxygen bond represented by the formula SiO$_2$·nH$_2$O (0≦n≦2), having an amorphous form, a non-crystalline form, a glass form, a colloidal form, a solution form, a crystal form or the like; polysilicates represented by Na$_6$Si$_2$O$_7$ and Na$_2$Si$_4$O$_9$; and solid solutions of silicon with aluminum and/or a metal (e.g., magnesium, manganese, lithium, lanthanum, yttrium, niobium, tantalum, etc.).

[Production Method of Powder Composition for Capacitors and of Sintered Body]

For producing the powder composition or sintered body for capacitors, not only a method of adding the above-described compound having a silicon-oxygen bond from the beginning but also a method of causing a chemical reaction such as hydrolysis, condensation reaction or oxidation reaction and/or a thermal reaction at the stage of producing a composition containing a silicon-containing compound and tantalum or niobium or at the stage of manufacturing a sintered body, to produce a powder composition for capacitors comprising a tantalum or niobium and a compound having a silicon-oxygen bond, or a sintered body using the powder composition for capacitors, may be used.

As the silicon-containing compound, the compounds represented by formulae (8) to (10) and metal silicon may be used, and these may be used either individually or in combination of two or more thereof:

$$R^9(SiR^{10}R^{11})_nR^{12} \qquad (8)$$

$$Si_f(Z)_gN_h \qquad (9)$$

$$Me_s(SiX)_t \qquad (10)$$

In the formulae (8) to (10), R$^9$ to R$^{12}$ (R$^9$, R$^{10}$, R$^{11}$ and R$^{12}$) represent each hydrogen; an alkyl group having 6 or less carbon atoms substituted with at least one of thiol, cyano, amino, hydroxy, ester, halogen, alkene, alkyne and cycloalkane; an alkyl group having 6 or less carbon atoms; a phenyl group; an ethylenyl group, an ester group, a silyl group represented by R$^9$R$^{10}$R$^{11}$Si (wherein R$^9$ to R$^{11}$ are the same as defined above); a metal atom (element); a cyano group; an NCS group; an NCO group; a halogen; and a P(R$_9$)$_2$ group (wherein R$^9$ is the same as defined above), Z represents one selected from hydrogen, carbon, nitrogen, sulfur, boron, a metal and NH$_4$, n represents a positive integer, R$^9$ and R$^{12}$ may be combined. N represents a nitrogen element, X represents up to 6 halogen atoms inclusive of complex bond. f is a positive integer, g and h represent each zero or a positive integer, and s and t represent each a positive integer.

Specific examples of the silicon-containing compounds represented by formulae (8) to (10) include silane (e.g., SiH$_4$, Si$_2$H$_4$, Si$_3$H$_8$, Si$_4$H$_{10}$), polysilane, polydimethylsilicon, polydiphenylsilicon, polydiethylsilicon, polymethylethyl-silicon, polymethylphenylsilicon, dimethyltetra(trimethyl-silyl)disilane, (CH$_3$)$_2$SiCl$_2$, (CH$_3$)SiCl$_3$, φ$_2$SiCl$_2$, φSiCl$_3$, NaHSiCl$_2$, KHSiCl$_2$, Na$_2$HSiCl, K$_2$HSiCl, LiHSiCl$_2$, Li$_2$HSiCl, Na$_2$SiCl$_2$, K$_2$SiCl$_2$, NaSiCl$_3$, KSiCl$_3$, LiSiCl$_3$, Li$_2$SiCl$_2$; and SiH$_{1.2}$ to SiH$_{1.7}$, SiC, Si$_3$N$_4$, SiS$_2$, SiSe$_2$, SiB$_4$ and SiB$_{12}$; and so on.

In the present invention, there may be used a method of producing a composition comprising tantalum or niobium and a compound having a silicon-oxygen bond by using both the compound having a silicon-oxygen bond and the silicon-containing compound as starting materials and causing a chemical reaction such as hydrolysis, condensation reaction or oxidation reaction and/or a thermal reaction at the stage of preparing a composition comprising those compounds and tantalum or niobium or at the stage of preparing a sintered body. Also, a method of producing a sintered body using the powder composition obtained for capacitors may be used.

In the case where the compound having a silicon-oxygen bond or the silicon-containing compound for use in the present invention are solid, the compounds are each preferably rendered to have an average particle size of 10 μm or less, preferably 2 μm or less, so that the compound can readily cover a part or most parts of the surface of tantalum or niobium at the production of the above-described composition.

The content of the compound having a silicon-oxygen bond in the composition is at least 0.5% by mass or more, preferably 1% by mass or more, more preferably from 5 to 30% by mass. If the content is less than 0.5% by mass, the effect of increasing the capacitance of the capacitor cannot be attained, whereas if it exceeds 30% by mass, the sintered body manufactured is increased in the sites allowing only the compound having a silicon-oxygen bond to remain as a mixture with the composition other than the sites where a composition comprising tantalum or niobium and the compound having a silicon-oxygen bond is formed, resulting in that the capacitance rather decreases.

Specific examples of the method for producing the powder composition of the present invention include, for example, (1) a method of adding the compound having a silicon-oxygen bond to a conventionally known powdered tantalum or niobium and pulverizing the mixture by a dry process or in water or an appropriate organic medium (e.g., alcohol, ester, oil, etc.) to prepare the composition, (2) a method of adding the compound having a silicon-oxygen bond to a lump, small pieces or powder of hydrogen-occluded tantalum or niobium, pulverizing the tantalum or niobium by a dry process or in water or an appropriate organic medium described above and dehydrogenating the resulting composition to obtain the objective composition, and (3) a method of causing a chemical reaction such as oxidation reaction, hydrolysis or condensation reaction and/or a thermal reaction at an appropriate time before or after the process of adding a liquid compound having a silicon-oxygen bond or a silicon-containing compound to powdered tantalum or niobium or to a lump, small pieces or powder of hydrogen-occluded tantalum or niobium as described above and pulverizing and then dehydrogenating it, to produce a composition in which a solid compound having a silicon-oxygen bond forms one component. Two or more of these methods may also be used in combination.

In these methods, the pulverization may be performed by adding balls formed of an appropriate constructive material to increase the pulverization competence. In the case of performing the pulverization by a dry process, a jet mill may be used. Furthermore, the pulverization is preferably performed in an inert gas atmosphere because excess oxidation reaction does not occur.

The tantalum or niobium as an essential component of the composition may be an alloy mainly comprising tantalum or niobium.

Also, tantalum or niobium, whose surface is usually oxidized to contain oxygen in an amount of approximately from 0.3% by mass to 10% by mass, may be previously treated with hydrofluoric acid, a mixed acid of hydrofluoric acid and nitric acid, a mixed solution of hydrofluoric acid and aqueous hydrogen peroxide, or the like, to remove or decrease the oxygen on the surface.

In the production of the composition, when powdered tantalum or niobium is used as the starting material, the average particle size of powdered tantalum is from 0.1 μm to 5 μm, preferably from 0.2 μm to 2 μm, and the average particle size of powdered niobium is from 0.1 μm to 7 μm, preferably from 0.1 μm to 5 μm. If the average particle size exceeds each maximum value, the product CV/g value of capacitance and electrochemical formation voltage, which is described later, cannot exceed 20,000 and the requirement for higher capacitance cannot be satisfied. On the other hand, if each average particle size is less than 0.1 μm, when a capacitor is manufactured using a sintered body of the powder composition of the present invention and a solid material is used for another part electrode, the material cannot be easily impregnated into the inside of the sintered body.

In the production of the above powder composition, it is also possible to use the powder of secondary particles (a particle resulting from primary particles aggregating while roughly maintaining the shape of primary particle) prepared by granulating the powdered tantalum or niobium as the starting material to increase the average particle size by a number of from 1 to 2 figures.

Furthermore, in the production of the above powder composition, when the composition is produced using hydrogen-occluded tantalum or niobium, the powder composition may be produced without dehydrogenation and may be dehydrogenated at the sintering, but whether the dehydrogenation is performed at the stage of composition or at the time of sintering, the dehydrogenation is preferably performed, in view of the LC value, such that the final sintered body has a residual hydrogen content of 0.02% by mass or less.

The tantalum or niobium as one component of the composition of the present invention may be a partially nitrided tantalum or niobium. In this case, the nitride amount is from 500 ppm to 50,000 ppm by mass, preferably from 700 ppm to 10,000 ppm by mass, more preferably from 1,000 ppm to 7,000 ppm by mass. When the nitride amount is within this range, the sintered body manufactured from the powder for capacitors comprising this composition exhibits a further preferable LC value.

In the present invention, the components of powder composition for capacitors comprising the composition may also be partly nitrided. Furthermore, it is also possible to nitride, as described above, a part of tantalum or niobium as one component and then further nitride the resulting powder composition formed. In this case, the nitride amount is from hundreds of ppm to tens of thousands of ppm by mass, preferably from 500 ppm to 7,000 ppm by mass. When the nitride amount is within this range, the sintered body manufactured from this powder composition for capacitors exhibits a further preferable LC value. In addition, when the sintered body manufactured is nitrided to have an objective nitride amount, the LC values can be advantageously prevented from dispersing.

The term "tantalum, niobium or a composition is nitrided" as used herein means a state where nitrogen is present in the material by forming a solid solution or by the clathration or chemical reaction, and does not include mere adsorption of nitrogen to the material.

These materials can be nitrided by a method using any one of liquid nitriding, ion nitriding and gas nitriding or using a combination thereof. The gas nitriding treatment in a nitrogen gas atmosphere is preferred because the apparatus used is simple and easy to operate. For example, the gas nitriding method in a nitrogen gas atmosphere may be achieved by allowing the material to stand in a nitrogen atmosphere. Tantalum, niobium or a composition having an objective nitride amount may be obtained by allowing the material to stand for tens of hours in a nitriding atmosphere at a temperature of 2,000° C. or lower, preferably 300 to 1,000° C. When the material is treated at a high temperature, the treatment time may be reduced. The nitride amount can be controlled to fall within the range of from 500 ppm to 7,000 ppm by mass by performing a preliminary test or the like to confirm the nitriding temperature and the nitriding time.

The average particle size of the powder composition of the present invention is 5 μm or less, preferably from 0.1 μm to 5 μm. If the particle size does not fall within this range, similarly to the case described above for the particle size range of powdered tantalum or niobium, the capacitance decreases or the cathode material is liable to fail in impregnating. In order to facilitate the impregnation of the cathode material, the composition of the present invention may be granulated into secondary particles, similarly to the case of the above-described powdered tantalum or niobium.

A sintered body using the powder composition for capacitors of the present invention is produced by sintering the thus-obtained powder composition for capacitors. The method of producing a sintered body is not particularly limited. A sintered body may be obtained, for example, by press-molding the powder for capacitors into a predetermined shape and then heating it at from 500 to 2,000° C. and at from 1 to $1\times10^{-6}$ Torr ($1.33\times10^2$ to $1.33\times10^{-4}$ Pa) for from a few minutes to a few hours.

At the sintering, a binder (for example, a solution of a few % by mass of a binder component such as camphor, acrylic polymer or poly(vinyl alcohol) in an organic solvent such as alcohol or in water) may be added to the powder composition for capacitors in an amount of a few % by mass based on the powder so as to increase the molding strength.

It is also possible to keep the composition as a composition containing a compound having a silicon-oxygen bond or a silicon-containing compound in a liquid form and tantalum or niobium during the stage of the powder composition for capacitors, and at the time of sintering the composition for manufacturing a sintered body, to perform hydrolysis, condensation reaction, oxidation reaction and/or thermal reaction, whereby a sintered body may be obtained using a powder comprising a composition comprising a compound having a silicon-oxygen bond in a solid-form and tantalum or niobium.

In the case where a silicon-containing compound is used as one component of the composition, the silicon-containing compound may be oxidized, for example, by introducing mainly air or oxygen in a relatively low temperature region of the sintering treatment and thereby converted into a compound having a silicon-oxygen bond, which is thereafter treated at a high temperature and at the above-described degree of vacuum to produce a sintered body. In this case, the temperature and the time for the introduction of air or oxygen are preferably confirmed by a preliminary test such that the oxidation reaction does not proceed too excessively to oxidize even tantalum or niobium as another part component of the composition in excess of 3% by mass.

Another embodiment of obtaining a nitrided sintered body of the present invention is described below.

A molded compact of the powder composition of the present invention for capacitors is sintered and the resulting sintered body is allowed to stand in a nitrogen atmosphere, whereby a partially nitrided niobium sintered body can be obtained. When a capacitor is manufactured to have a construction comprising this sintered body as one part electrode, a dielectric material formed on the surface of the sintered body and another part electrode, the capacitor produced can have good LC properties, particularly reduced fluctuation.

In this case, by controlling the amount of nitrogen bonded in the sintered body to from 10 ppm to 150,000 ppm by mass, preferably from 100 ppm to 50,000 ppm by mass, the LC value can be reduced.

A niobium sintered body having an objective nitrogen amount can be obtained at a nitriding temperature of 2,000° C. or lower for a nitriding time of tens of hours. However, generally a higher nitriding temperature requires shorter time for accomplishing the nitriding. Even at room temperature, when the niobium sintered body is allowed to stand in a nitrogen atmosphere for tens of hours, a niobium sintered body having a nitrogen amount of hundreds of ppm by mass can be obtained. Also, by introducing nitrogen under pressure, the nitriding time may be reduced. Conversely, if nitrogen is introduced under reduced pressure, the nitriding time is prolonged. For example, even if the above-described niobium sintered body is allowed to stand under extremely reduced pressure of 1/100 Torr (1.33 Pa), nitriding scarcely occurs within a time of several tens of hours which is suitable for industrial practice.

[Production of Capacitor]

Using the thus-obtained sintered body as one part electrode, a capacitor is produced by interposing the dielectric material formed on the sintered body between this electrode and another part electrode. The dielectric material of this capacitor is presumed to be a composite material of an oxide of tantalum or niobium and a compound having a silicon-oxygen bond or a compound produced resulting from the chemical reaction of the compound having a silicon-oxygen bond during the production process. For example, the composite material is obtained by electrochemically forming the sintered body produced from the composition, which is one part electrode, in an electrolytic solution. The electrochemical formation of the sintered body in an electrolytic solution is usually performed using an aqueous protic acid solution, for example, an aqueous 0.1% phosphoric acid solution or an aqueous 0.1% sulfuric acid solution. When the sintered body is electrochemically formed in an electrolytic solution to form a dielectric material considered to be a composite material and a capacitor is manufactured using this, an electrolytic capacitor is obtained. In this case, the sintered body side takes charge of the anode.

On the other hand, the other part electrode of the capacitor of the present invention is not particularly limited and, for example, at least one compound selected from an electrolytic solution, an organic semiconductor and an inorganic semiconductor, which are all known in the art of aluminum electrolytic capacitors, may be used.

Specific examples of the electrolytic solution include a mixed solution of dimethylformamide and ethylene glycol having dissolved therein 5% by mass of an isobutyltripropylammonium borontetrafluoride electrolyte, and a mixed solution of propylene carbonate and ethylene glycol having dissolved therein 7% by mass of tetraethylammonium borontetrafluoride.

Specific examples of the organic semiconductor include an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer represented by formula (11) or (12) shown below. Specific examples of the inorganic semiconductor include an inorganic semiconductor mainly comprising lead dioxide or manganese dioxide, and an inorganic semiconductor comprising triiron tetroxide. These semiconductors may be used either individually or in combination of two or more thereof.

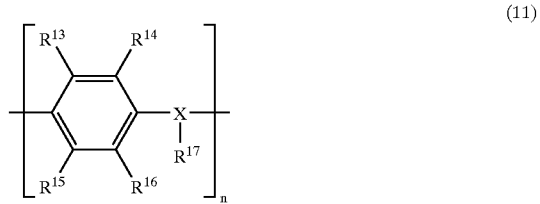

(11)

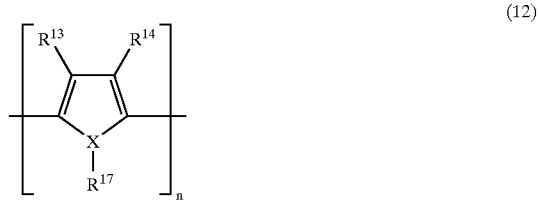

(12)

In formulae (11) and (12), $R^{13}$ to $R^{16}$, which may be the same or different, represent each hydrogen, an alkyl group having from 1 to 6 carbon atoms or an alkoxy group having from 1 to 6 carbon atoms, X represents an oxygen atom, a sulfur atom or a nitrogen atom, $R^{17}$ is present only when X is a nitrogen atom, and represents hydrogen or an alkyl group having from 1 to 6 carbon atoms, $R^{13}$ and $R^{14}$ or $R^{15}$ and $R^{16}$ may be combined with each other to form a ring, and n represents a polymerization degree.

Examples of the polymers represented by formulae (11) and (12) include polyaniline, polyoxyphenylene, polyphenylene sulfide, polythiophene, polyfuran, polypyrrole, polymethylpyrrole and derivatives of these polymers.

Out of these organic or inorganic semiconductors, when a semiconductor having an electric conductivity of from $10^{-2}$ $S \cdot cm^{-1}$ to $10^3$ $S \cdot cm^{-1}$ is used, the capacitor manufactured can be more reduced in the impedance value and can be more increased in the capacity at a high frequency.

In the case where the another part electrode is a solid, a capacitor is fabricated, for example, by sequentially laminating carbon paste and silver paste on the another part electrode and sealing the whole with a material such as epoxy resin. This capacitor may have a niobium or tantalum lead which may be sintered and formed integrally with the sintered body or may be afterward welded. In the case where the another part electrode is a liquid, a capacitor constructed from those two electrodes and the dielectric material is housed, for example, in a can electrically connected to the another part electrode to accomplish the capacitor. In this case, the sintered body electrode side is guided outside through the niobium or tantalum lead and at the same time, designed to be insulated from the can using an insulating rubber or the like.

As described in the foregoing, when a capacitor is manufactured using the sintered body having a good LC value and a large capacitance according to the present invention, the capacitor obtained can have a small LC value, good reliability and a high capacitance.

BEST MODE FOR CARRYING OUT THE INVENTION

Hereinafter, the present invention will be described in detail by the following examples. However, the present invention is by no means limited thereto.

In the following test examples, various physical properties were measured by the following methods.

1) Content of Compound Having a Silicon-Oxygen Bond in the Powder

The amount of the compound having a silicon-oxygen bond contained in the powder was calculated based on the amount of silicon determined by the ICP (inductively coupled plasma) emission analysis and the structure of the compound. In the case of a hydrate, the content was determined in terms of a non-hydrous material.

2) Nitride Amount in the Powder

The amount of nitrogen in the powder was determined using an oxygen/nitrogen analyzer manufactured by LECO Corp. capable of determining the nitrogen amount from the heat conductivity, and the ratio thereof to the mass of the powder separately measured was defined as the nitride amount.

3) Capacitance of a Sintered Body after Electrochemical Formation

The capacitance at 120 Hz measured at room temperature by connecting an LCR measuring apparatus manufactured by Hewlett-Packard Company between a sintered body dipped in 30% sulfuric acid and a tantalum electrode placed in a sulfuric acid solution was defined as the capacitance of the sintered body.

4) Leakage Current (LC) of the Sintered Body

A dc voltage corresponding to 70% (14 V) of the electrochemical formation voltage at the time of manufacturing a dielectric material was continuously applied at room temperature for 3 minutes between a sintered body dipped in an aqueous 20% phosphoric acid solution and an electrode placed in an aqueous phosphoric acid solution and then the current value was measured. The value obtained was defined as the leakage current value.

5) Capacitance of a Capacitor Formed Into a Chip

A capacitance at 120 Hz was measured at room temperature by connecting an LCR measuring apparatus manufactured by Hewlett-Packard Company between terminals of the chip and the value obtained was defined as the capacitance of the capacitor formed into a chip.

6) Leakage Current of a Capacitor Formed Into a Chip

A dc voltage (6.3 V) close to from about ⅓ to about ¼ of the electrochemical formation voltage at the time of manufacturing a dielectric material was selected from rated voltage values (e.g., 2.5 V, 4 V, 6.3 V, 10 V, 16 V, 25 V) and continuously applied at room temperature for 1 minute between terminals of the chip manufactured and then the current value was measured. The value obtained was defined as the leakage current value of the capacitor formed into a chip.

EXAMPLE 1

Production of Powder Composition for Capacitors

Test Examples 1 (1 to 11), 2 (1 to 11), 3 (1 to 8), 4 (1 to 9), 5(1–10), and 6 (1 to 6):

An about 10-mmφ tantalum bar (purity: 99.9% by mass) was hydrogenated and crudely crushed into lumps having a size of about a few mm. The lumps were mixed with a compound having a silicon-oxygen bond shown in (1) to (6) below and ground in a submarine automatic mortar.

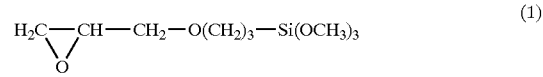

(Test Example 1)

(2) $Si(OC_2H_5)_4$ (Test Example 2)

(3) $MnSiO_3 \cdot nH_2O$ (average particle diameter (D50)=1 μm) (Test Example 3)

(4) $CaMnSiO_4$ (D50=1 μm) (Test Example 4)

(5) Non-crystalline $SiO_2$ (D50=0.02 μm) (Test Example 5)

(6) Wollastonite ($CaSiO_3$) (D50=0.9 μm) (Test Example 6)

After the completion of the grinding, the ground matter was centrifuged, the supernatant moiety was removed, and the residue was dried to obtain a composition comprising tantalum and a compound having a silicon-oxygen bond. By varying the charged amount of the compound having a silicon-oxygen bond and the grinding time, the compositional amount of the compound having a silicon-oxygen bond in the composition and the particle size of the composition were controlled. Thereafter, the composition was dehydrogenated by allowing it to stand at 450° C. under reduced pressure to obtain a composition having a residual hydrogen amount of 100 ppm by mass or less. The numerical values showing content of compound having a silicon-oxygen bond in respective compositions prepared and the average particle size of the composition are shown together in Table 1. Also, a test example where the compound having a silicon-oxygen bond was not added is shown in Table 1.

Test Example 7 (1 to 4):

In Test Example 3, two kinds of compositions having a $MnSiO_3 \cdot nH_2O$ (D50=1 μm) content of 6.2% by mass [3(5)] or 13% by mass [3(6)] were allowed to stand at 400° C. for 3 hours in a nitrogen stream or at 800° C. for 5 hours in a nitrogen stream, to obtain partially nitrided compositions (Test Example 7(1): content 6.2%, nitride amount 0.31%, Test Example 7(2): content 6.2%, nitride amount 0.68%, Test Example 7(3): content 13%, nitride amount 0.38%, Test Example 7(4): content 13%, nitride amount 0.73%). Various physical properties data of respective compositions are shown together in Table 1.

TABLE 1

| Test Example | Compound Having Silicon-Oxygen Bond or Silicon-Containing Compound | | Average Particle Size of Composition (μm) |
|---|---|---|---|
| | Compound | Content (% by mass) | |
| 1(1) | H₂C—CH—CH₂—O(CH₂)₃—Si(OCH₃)₃ (with epoxide O) | 0 | 2 |
| 1(2) | | 0.3 | " |
| 1(3) | | 0.7 | " |
| 1(4) | | 0.9 | " |
| 1(5) | | 1.1 | " |
| 1(6) | | 3 | " |
| 1(7) | | 5 | " |
| 1(8) | | 11 | " |
| 1(9) | | 20 | " |
| 1(10) | | 28 | " |
| 1(11) | | 35 | " |
| 2(1) | Si(OC₂H₅)₄ | 0 | 1.4 |
| 2(2) | | 0.3 | " |
| 2(3) | | 0.7 | " |
| 2(4) | | 0.9 | " |
| 2(5) | | 1.2 | " |
| 2(6) | | 3.3 | " |
| 2(7) | | 5.1 | " |
| 2(8) | | 12 | " |
| 2(9) | | 21 | " |
| 2(10) | | 29 | " |
| 2(11) | | 36 | " |
| 3(1) | MnSiO₃.nH₂O D50 = 1 μm | 0.3 | 1.4 |
| 3(2) | | 0.6 | " |
| 3(3) | | 0.9 | " |
| 3(4) | | 1.3 | " |
| 3(5) | | 6.2 | " |
| 3(6) | | 13 | " |
| 3(7) | | 28 | " |
| 3(8) | | 33 | " |
| 4(1) | CaMnSiO₄ D50 = 1 μm | 0.25 | 1.4 |
| 4(2) | | 0.6 | " |
| 4(3) | | 0.9 | " |
| 4(4) | | 1.2 | " |
| 4(5) | | 6.0 | " |
| 4(6) | | 11 | " |
| 4(7) | | 24 | " |
| 4(8) | | 31 | " |
| 4(9) | | 36 | " |
| 5(1) | Non-crystalline SiO₂ D50 = 0.02 μm | 0 | 0.7 |
| 5(2) | | 0.3 | " |
| 5(3) | | 0.5 | " |
| 5(4) | | 0.8 | " |
| 5(5) | | 1.2 | " |
| 5(6) | | 5.3 | " |
| 5(7) | | 11 | " |
| 5(8) | | 22 | " |
| 5(9) | | 29 | " |
| 5(10) | | 36 | " |
| 6(1) | Wollastonite CaSiO₃ D50 = 0.9 μm | 13 | 10 |
| 6(2) | | " | 7 |
| 6(3) | | " | 4 |
| 6(4) | | " | 1.5 |
| 6(5) | | " | 0.8 |
| 6(6) | | " | 0.6 |
| 7(1) | MnSiO₃.nH₂O D50 = 1 μm; N = 0.31% by mass | 6.2 | 1.4 |
| 7(2) | N = 0.68% by mass | 6.2 | " |
| 7(3) | N = 0.38% by mass | 13 | " |
| 7(4) | N = 0.73% by mass | 13 | " |

Test Examples 8 (1 to 12), 9 (1 to 10), 10 (1 to 8), and 11 (1 to 6)

An about 44-mmφ niobium bar (purity: 99.7% by mass) was hydrogenated and crudely crushed into lumps having a size of a few mm. The lumps were mixed with a compound having a silicon-oxygen bond shown in (1) to (4) below and then ground in a submarine automatic mortar.

(1) NH₂(CH₂)₃—Si(OC₂H₅)₃ (Test Example 8)
(2) MnSiO₃.nH₂O (D50=1 μm) (Test Example 9)
(3) Non-crystalline SiO₂ (D50=0.02 μm) (Test Example 10)
(4) Silicic acid (D50=2 μm) (Test Example 11)

Thereafter, the ground matter was treated in the same manner as in Test Example 1 to obtain a composition containing niobium and a compound having a silicon-oxygen bond in various concentrations. The physical properties data of the compositions are shown in Table 2.

Test Example 12:

The powdered niobium (not dehydrogenated) having a nitride amount of 0.21% by mass and not containing a compound having a silicon-oxygen bond, used in Test Example 9(1), was mixed with manganese silicate having an average particle size of 1 μm ($MnSiO_3 \cdot nH_2O$, D50=1 μm) and then ground and after-treated in the same manner as in Test Example 9(8) to obtain a composition containing about 13% by mass of manganese silicon. This composition was dehydrogenated by allowing it to stand at 450° C. under reduced pressure to obtain a composition having a residual hydrogen amount of 100 ppm by mass or less. Various physical properties data of the composition produced are shown together in Table 2.

Test Example 13 (1 to 3):

Compositions were produced in the same manner as in Test Example 9(8) except for changing the nitriding time to 250° C., 300° C. or 800° C. and the nitriding time to 2 hours. Various physical properties data of the compositions produced are shown together in Table 2.

Test Example 14 (1 to 4):

Nitrided and dehydrogenated compositions were obtained in the same manner as in Test Example 8 except for adding a silicon-containing compound of tetrabromosilane (Test Example 14(1)), $Si(NCO)_4$ (Test Example 14(2)), finely powdered $SiS_2$ (Test Example 14(3)) or finely powdered Si (Test Example 14(4)) in place of $NH_2(CH_2)_3-Si(OC_2H_5)_3$ in Test Example 8. Thereafter, in Test Examples 14(1), 14(2) and 14(3), the compositions were each heated at 300° C. in vacuum and in Test Example 14(3), carbon dioxide was passed through the composition at 350° C. In each Test Example, a composition containing niobium and a compound having a silicon-oxygen bond, $SiO_2$, was obtained. Various physical properties data in respective Test Examples are shown together in Table 2.

TABLE 2

| Test Example | Compound Having Silicon-Oxygen Bond or Silicon-Containing Compound | Content of Compound in Composition (% by mass) | Average Particle Size of Composition (μm) | Nitride amount of Composition (% by mass) |
|---|---|---|---|---|
| 8(1) | $NH_2-(CH_2)_3-Si(OEt)_3$ | 0 | 5 | 0.32 |
| 8(2) | | 0.3 | " | 0.32 |
| 8(3) | | 0.5 | " | 0.33 |
| 8(4) | | 0.8 | " | 0.34 |
| 8(5) | | 1.2 | " | 0.34 |
| 8(6) | | 3.3 | " | 0.30 |
| 8(7) | | 5.2 | " | 0.31 |
| 8(8) | | 12 | " | 0.28 |
| 8(9) | | 21 | " | 0.29 |
| 8(10) | | 28 | " | 0.28 |
| 8(11) | | 33 | " | 0.31 |
| 8(12) | | 40 | " | 0.32 |
| 9(1) | $MnSiO_3 \cdot nH_2O$ | 0 | 2 | 0.21 |
| 9(2) | D50 = 1 μm | 0.3 | " | 0.21 |
| 9(3) | | 0.6 | " | 0.22 |
| 9(4) | | 0.9 | " | 0.22 |
| 9(5) | | 1.3 | " | 0.19 |
| 9(6) | | 3.2 | " | 0.18 |
| 9(7) | | 5.8 | " | 0.19 |
| 9(8) | | 12 | " | 0.23 |
| 9(9) | | 28 | " | 0.23 |
| 9(10) | | 34 | " | 0.24 |
| 10(1) | non-crystalline | 0 | 0.8 | 0.26 |
| 10(2) | $SiO_2$ | 0.3 | " | 0.25 |
| 10(3) | D50 = 0.02 μm | 0.6 | " | 0.25 |
| 10(4) | | 1.2 | " | 0.26 |
| 10(5) | | 5.2 | " | 0.26 |
| 10(6) | | 15 | " | 0.26 |
| 10(7) | | 29 | " | 0.27 |
| 10(8) | | 34 | " | 0.27 |
| 11(1) | Silicic acid | 15 | 15 | 0.28 |
| 11(2) | D50 = 2 μm | " | 7 | 0.24 |
| 11(3) | | " | 5 | 0.23 |
| 11(4) | | " | 2 | 0.23 |
| 11(5) | | " | 0.8 | 0.26 |
| 11(6) | | " | 0.2 | 0.29 |
| 12(1) | $MnSiO_3 \cdot nH_2O$ D50 = 1 μm | 13 | 2 | 0.26 |
| 13(1) | $MnSiO_3 \cdot nH_2O$ | 12 | 2 | 0.04 |
| 13(2) | D50 = 1 | " | 38 | 0.16 |
| 13(3) | | " | " | 0.82 |
| 14(1) | Tetrabromosilane | 10 | 5 | 0.30 |
| 14(2) | $Si(NCO)_4$ | 8.5 | " | 0.31 |
| 14(3) | finely powdered $SiS_2$ | 13 | " | 0.30 |
| 14(4) | finely powdered Si | 7.2 | " | 0.27 |

EXAMPLE 2

Production of a Sintered Body 0.14 g (Test Examples 1 to 7) or 0.10 g (Test Examples 8 to 14) of each powder comprising the composition obtained in Test Examples 1 to 14 was molded together with a tantalum lead (Test Examples 1 to 7) or a niobium lead (Test Examples 8 to 14) to obtain molded compacts having a size of from 3.8×3.5×1.8 mm to 4.5×3.5×1.8 mm. Subsequently, each molded compact was sintered at 1,550° C. (Test Examples 1 to 7) or 1,200° C. (Test Examples 8 to 14) in vacuum ($3 \times 10^{-5}$ Torr ($4 \times 10^{-3}$ Pa)) to obtain a sintered body. 10 Slugs were prepared for each sintered body and electrolytically oxidized in an aqueous 0.1% phosphoric acid solution at an electrochemical forming voltage of 20 V to form an electrolytic oxide film on the surface. The LC values and the CV values (each is an average of 10 slugs) per unit mass of the sintered bodies of Test Examples 1 to 7 having formed thereon an oxide film are shown in Table 3 and those of the sintered bodies of Test Examples 8 to 14 are shown in Table 4. FIG. 1 is a diagram obtained by plotting the relationship between the product of capacitance and electrolytic voltage (CV/g) vs leakage current (LV/g) for each content of the compound having a silicon-oxygen bond based on Tables 1 to 4.

TABLE 3

| Test Example | Nitriding Conditions | LC μA/g | CV μF · V/g |
|---|---|---|---|
| 1(1) | not nitrided | 1.9 | 27000 |
| 1(2) | | 1.9 | 27000 |
| 1(3) | | 1.5 | 30000 |
| 1(4) | | 1.5 | 30000 |
| 1(5) | | 1.2 | 31000 |
| 1(6) | | 1.2 | 31000 |
| 1(7) | | 0.7 | 32000 |
| 1(8) | | 0.3 | 33000 |
| 1(9) | | 0.5 | 33000 |
| 1(10) | | 1.0 | 31000 |
| 1(11) | | 1.9 | 27000 |
| 2(1) | not nitrided | 5.5 | 41000 |
| 2(2) | | 5.5 | 41000 |
| 2(3) | | 4.9 | 42000 |
| 2(4) | | 4.8 | 42000 |
| 2(5) | | 4.0 | 43000 |
| 2(6) | | 3.5 | 43000 |
| 2(7) | | 1.5 | 43000 |
| 2(8) | | 1.2 | 44000 |
| 2(9) | | 1.6 | 44000 |
| 2(10) | | 2.8 | 43000 |
| 2(11) | | 5.7 | 40000 |
| 3(1) | not nitrided | 5.5 | 41000 |
| 3(2) | | 4.9 | 41000 |
| 3(3) | | 4.9 | 42000 |
| 3(4) | | 4.0 | 42000 |
| 3(5) | | 1.6 | 42000 |
| 3(6) | | 1.1 | 44000 |
| 3(7) | | 1.7 | 42000 |
| 3(8) | | 5.8 | 40000 |
| 4(1) | not nitrided | 5.6 | 40000 |
| 4(2) | | 3.9 | 41000 |
| 4(3) | | 3.4 | 41000 |
| 4(4) | | 2.8 | 42000 |
| 4(5) | | 1.9 | 44000 |
| 4(6) | | 1.1 | 45000 |
| 4(7) | | 2.5 | 43000 |
| 4(8) | | 5.6 | 40000 |
| 4(9) | | 5.7 | 40000 |
| 5(1) | not nitrided | 10 | 52000 |
| 5(2) | | 10 | 52000 |
| 5(3) | | 8 | 53000 |
| 5(4) | | 7 | 53000 |
| 5(5) | | 5 | 53000 |
| 5(6) | | 3 | 54000 |
| 5(7) | | 2.3 | 55000 |
| 5(8) | | 2.8 | 54000 |
| 5(9) | | 3.2 | 53000 |
| 5(10) | | 11 | 52000 |
| 6(1) | not nitrided | 0.02 | 2000 |
| 6(2) | | 0.04 | 9000 |
| 6(3) | | 0.1 | 20000 |
| 6(4) | | 1.0 | 40000 |
| 6(5) | | 1.8 | 51000 |
| 6(6) | | 4.2 | 70000 |
| 7(1) | $N_2$ stream, 400° C. × 3 hr | 1.2 | 42000 |
| 7(2) | $N_2$ stream, 400° C. × 3 hr | 1.3 | 42000 |
| 7(3) | $N_2$ stream, 800° C. × 5 hr | 0.9 | 44000 |
| 7(4) | $N_2$ stream, 800° C. × 5 hr | 1.8 | 43000 |

TABLE 4

| Test Example | Nitriding Conditions | LC μA/g | CV μF · V/g |
|---|---|---|---|
| 8(1) | 800° C. × 2–5 hr | 3.0 | 30000 |
| 8(2) | | 3.0 | 30000 |
| 8(3) | | 2.1 | 31000 |
| 8(4) | | 2.0 | 31000 |
| 8(5) | | 1.6 | 32000 |
| 8(6) | | 1.5 | 33000 |
| 8(7) | | 0.8 | 34000 |
| 8(8) | | 0.5 | 35000 |
| 8(9) | | 0.6 | 35000 |
| 8(10) | | 0.9 | 34000 |
| 8(11) | | 3.1 | 30000 |
| 8(12) | | 5.2 | 24000 |
| 9(1) | 400° C. × 2–5 hr | 10 | 50000 |
| 9(2) | | 8.6 | 50000 |
| 9(3) | | 8.6 | 51000 |
| 9(4) | | 6.5 | 51000 |
| 9(5) | | 6.4 | 52000 |
| 9(6) | | 5.3 | 52000 |
| 9(7) | | 2.1 | 53000 |
| 9(8) | | 1.2 | 54000 |
| 9(9) | | 2.5 | 53000 |
| 9(10) | | 11 | 50000 |
| 10(1) | 300° C. × 2–5 hr | 100 | 120000 |
| 10(2) | | 98 | 120000 |
| 10(3) | | 80 | 122000 |
| 10(4) | | 36 | 125000 |
| 10(5) | | 24 | 127000 |
| 10(6) | | 20 | 130000 |
| 10(7) | | 36 | 127000 |
| 10(8) | | 108 | 118000 |
| 11(1) | 300° C. × 2–5 hr | 0.1 | 16000 |
| 11(2) | 300° C. × 2–5 hr | 0.2 | 21000 |
| 11(3) | 37° C. × 2–5 hr | 0.5 | 35000 |
| 11(4) | 300° C. × 2–5 hr | 2.1 | 54000 |
| 11(5) | 300° C. × 2–5 hr | 20 | 130000 |
| 11(6) | 300° C. × 2–5 hr | 110 | 250000 |
| 12(1) | not nitrided | 2.4 | 52000 |
| 13(1) | Nb 250° C. × 2 hr | 9.1 | 54000 |
| 13(2) | Nb 300° C. × 2 hr | 2.2 | 54000 |
| 13(3) | Nb 800° C. × 2 hr | 5.9 | 54000 |
| 14(1) | 800° C. × 2–5 hr | 0.6 | 35000 |
| 14(2) | | 0.7 | 34000 |
| 14(3) | | 0.5 | 35000 |
| 14(4) | | 0.7 | 33000 |

A sintered body was manufactured using the powder for capacitors comprising each composition and after forming an oxide dielectric film on the surface of the sintered body, the LC value and the CV value were evaluated. As apparently seen from FIG. 1, when the content of the compound having a silicon-oxygen bond in the composition is at least 0.5% by mass or more (cf. the second line from the left), preferably 1% by mass or more (cf. the third line from the left), and more preferably from 5% to 30% by mass (cf. the line at the extreme left), the CV value is always several times larger than that of the case where the content is 0% to 0.5% by mass (cf. the line at the extreme left), with the same LC value.

It can be seen that in the present invention, V is constantly 20 and hence the capacitance C is always increased. When the capacitors shown in Table 5 are compared with respect to the performance, it is seen that in the case of a capacitor manufactured using a powder for capacitors comprising tantalum or niobium and a compound having a silicon-oxygen bond, the capacitance is always greatly higher than those not containing the compound, and as compared with those having the same CV value, the LC value is as small as a few fractions.

EXAMPLE 3

Fabrication of Capacitors

Test Example 15 (1 to 16):

20 Slugs were prepared for each sintered body having thereon an electrolytic oxide film produced in the same manner as in Test Examples 2(1), 3(6), 5(1), 5(7), 9(1), 9(8), 10(1) or 10(6). As the other part electrode, a mixture of lead dioxide and lead sulfate (98% by mass) (Test Example 15 (1) to 15 (9)) was formed by repeated oxidation reaction in an aqueous lead sulfate solution and polypyrrole (Test Example 15 (9) to 15 (16)) was formed by repeated oxidation reaction in a polypyrrole dopant solution. Subsequently, a carbon layer and a silver paste layer were sequentially laminated thereon and this assembly was placed on a lead frame and then sealed with an epoxy resin to fabricate a chip-type capacitor. The capacitance and the average LC value (an average of n=20 for each case; the LC value is a measured value when a voltage of 6.3 V was applied at room temperature for 1 minute) of each capacitor manufactured are shown in Table 5.

Furthermore, an acceleration test for examining the deterioration of capacitance was performed by allowing each capacitor manufactured to stand at 105° C. and then applying a voltage of 6.3 V at 105° C. The number of capacitors where the decrement of capacitance with a lapse of 1,000 hours was less than 20% of the initial capacitance is shown in Table 5.,

TABLE 5

| Test Example (Test Example Used) | Other Part Electrode | C $\mu F$ | LC $\mu A$ | Number of Samples where Decrement of Capacitance is less than 20% (Sample Number n = 20) |
|---|---|---|---|---|
| 15(1) (2(1)) | Mixture of lead dioxide and lead sulfate (98% by mass) | 250 | 1.4 | 15/20 |
| 15(2) (3(6)) | | 270 | 0.4 | 20/20 |
| 15(3) (5(1)) | | 320 | 4.0 | 14/20 |
| 15(4) (5(7)) | | 340 | 1.1 | 20/20 |
| 15(5) (9(1)) | | 220 | 3.6 | 16/20 |
| 15(6) (9(8)) | | 240 | 0.9 | 20/20 |
| 15(7) (10(1)) | | 510 | 22 | 15/20 |
| 15(8) (10(6)) | | 550 | 4.2 | 20/20 |
| 15(9) (2(1)) | polypyrrole | 220 | 2.1 | 14/20 |
| 15(10) (3(6)) | | 240 | 0.9 | 20/20 |
| 15(11) (5(1)) | | 290 | 5.2 | 13/20 |
| 15(12) (5(7)) | | 310 | 1.6 | 20/20 |
| 15(13) (9(1)) | | 200 | 4.1 | 14/20 |
| 15(14) (9(8)) | | 220 | 1.3 | 20/20 |
| 15(15) (10(1)) | | 450 | 31 | 12/20 |
| 15(16) (10(6)) | | 470 | 8.3 | 20/20 |

As apparent from the results in Table 5, the capacitors of the present invention are small in the decrease of the capacitance even after the use for a few years and are highly reliable.

INDUSTRIAL APPLICABILILTY

A capacitor manufactured using the sintered body using the powder composition for capacitors of the present invention has a capacitance larger than that of conventionally used tantalum capacitors. When a capacitor is fabricated from this sintered body, an excellent capacitor can be obtained, which is small in the deterioration of capacitance and highly reliable and which can realize high CV or low LC as compared with conventional capacitors, more specifically, if the CV value is the same, the LC value is as small as a few fractions, and if the LC value is the same, the CV value is several times larger.

The invention claimed is:

1. A powder composition for capacitors, comprising tantalum or niobium and a silicon-containing compound represented by the following formula (1):

$$Si_f(Z)_g N_h \qquad (1)$$

wherein Si represents a silicon atom, Z represents one member selected from the group consisting of a nitrogen atom, a sulfur atom, a boron atom, a metal atom and $NH_4$, and N represents a nitrogen atom, f is a positive integer, g and h each independently represent 0 or a positive integer, provided that both g and h do not represent 0, and wherein the silicon-containing compound has an average particle size of 2 $\mu m$ or less and an amount of the silicon-containing compound contained in the powder composition is 0.5 to 30% by mass.

2. The powder composition for capacitors as claimed in claim 1, wherein the silicon-containing compound is at least one member selected from the group consisting of $Si_3N_4$, $SiB_4$ and $SiB_{12}$.

3. The powder composition for capacitors as claimed in claim 2, wherein the silicon-containing compound is $Si_3N_4$.

4. The powder composition for capacitors as claimed in claim 2, wherein the silicon-containing compound is $SiB_4$ or $SiB_{12}$.

5. The powder composition for capacitors as claimed in claim 1, wherein components in said composition are nitrided at least in part.

6. The powder composition for capacitors as claimed in claim 1, wherein the tantalum or niobium comprised in the powder composition for capacitor is partially nitrided.

7. A sintered body obtained by sintering a powder composition for capacitor described in claim 1.

8. The sintered body for capacitors as claimed in claim 7, wherein components in said composition are nitrided at least in part, and the nitrided amount is from 10 to 150,000 ppm by mass.

9. A capacitor comprising a sintered body described in claim 7 as one part electrode, a dielectric material formed on the surface of the sintered body, and another part electrode provided on the dielectric material.

10. A powder composition for capacitors, comprising tantalum or niobium and $SiSe_2$.

11. The powder composition for capacitors as claimed in claim 1, wherein an amount of the silicon-containing compound contained in the powder composition is 1 to 30% by mass.

12. The powder composition for capacitors as claimed in claim 1, wherein an amount of the silicon-containing compound contained in the powder composition is 5 to 30% by mass.

13. The powder composition for capacitors as claimed in claim 1, wherein an amount of the silicon-containing compound contained in the powder composition is 11 to 30% by mass.

* * * * *